United States Patent
Li et al.

(10) Patent No.: US 10,911,541 B1
(45) Date of Patent: Feb. 2, 2021

(54) DATA TRANSMISSION AND NETWORK INTERFACE CONTROLLER

(71) Applicant: Advanced New Technologies Co., Ltd., George Town (KY)

(72) Inventors: Changqing Li, Hangzhou (CN); Yinchao Zou, Hangzhou (CN); Peng Wu, Hangzhou (CN); Jincan Kong, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/945,621

(22) Filed: Jul. 31, 2020

Related U.S. Application Data (63) Continuation of application No. 16/809,273, filed on Mar. 4, 2020, now Pat. No. 10,785,306, which is a
(Continued)

(30) Foreign Application Priority Data

Jul. 11, 2019 (CN) .......................... 2019 1 0624819

(51) Int. Cl.
*G06F 15/167* (2006.01)
*H04L 29/08* (2006.01)
(Continued)

(52) U.S. Cl.
CPC ........ *H04L 67/1097* (2013.01); *H04L 5/0055* (2013.01); *H04L 41/12* (2013.01);
(Continued)

(58) Field of Classification Search
CPC ............. H04L 67/1097; H04L 67/1091; H04L 5/0055; H04L 41/12; H04L 49/901; H04L 49/9094; H04L 69/12
See application file for complete search history.

(56) References Cited

U.S. PATENT DOCUMENTS

| 10,509,764 B1 | 12/2019 | Izenberg et al. |
| 2006/0045108 A1 | 3/2006 | Blackmore et al. |

(Continued)

FOREIGN PATENT DOCUMENTS

| CN | 106487896 | 3/2017 |
| CN | 109981480 | 7/2019 |
| CN | 110460412 | 11/2019 |

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Philip B Tran
(74) *Attorney, Agent, or Firm* — Fish & Richardson P.C.

(57) ABSTRACT

Implementations of this disclosure provide data transmission operations and network interface controllers. An example method performed by a first RDMA network interface controller includes obtaining m data packets from a host memory of a first host; sending the m data packets to a second RDMA network interface controller of a second host; backing up the m data packets to a network interface controller memory integrated into the first RDMA network interface controller; determining that the second RDMA network interface controller does not receive n data packets of the m data packets; and in response, obtaining the n data packets from the m data packets that have been backed up to the network interface controller memory integrated into the first RDMA network interface controller, and retransmitting the n data packets to the second RDMA network interface controller.

18 Claims, 8 Drawing Sheets

Related U.S. Application Data continuation of application No. PCT/CN2020/071728, filed on Jan. 13, 2020.

(51) Int. Cl.
*H04L 12/861* (2013.01)
*H04L 12/879* (2013.01)
*H04L 12/24* (2006.01)
*H04L 5/00* (2006.01)
*H04L 29/06* (2006.01)

(52) U.S. Cl.
CPC ........ *H04L 49/901* (2013.01); *H04L 49/9094* (2013.01); *H04L 67/1091* (2013.01); *H04L 69/12* (2013.01)

(56) References Cited

U.S. PATENT DOCUMENTS

| | | |
|---|---|---|
| 2006/0274748 A1 | 12/2006 | Nakashima et al. |
| 2008/0126509 A1 | 5/2008 | Subramanian et al. |
| 2009/0125604 A1 | 5/2009 | Chang et al. |
| 2010/0082766 A1 | 4/2010 | Dreier |
| 2013/0262613 A1 | 10/2013 | Hefty |
| 2014/0052808 A1* | 2/2014 | Krishnan ................ H04L 67/40 709/212 |
| 2016/0026605 A1* | 1/2016 | Pandit .................... G06F 15/17 709/212 |
| 2016/0212214 A1 | 7/2016 | Rahman et al. |
| 2017/0075855 A1 | 3/2017 | Sajeepa et al. |
| 2018/0004705 A1 | 1/2018 | Menachem et al. |
| 2018/0069923 A1 | 3/2018 | Tsalmon |
| 2019/0079897 A1 | 3/2019 | Kochevar-Cureton et al. |
| 2019/0095106 A1 | 3/2019 | Li et al. |
| 2019/0171612 A1 | 6/2019 | Shahar et al. |
| 2020/0162394 A1* | 5/2020 | Barnea .................... H04L 47/56 |
| 2020/0218688 A1* | 7/2020 | Qu ........................ G06F 13/28 |

OTHER PUBLICATIONS

Fukuda et al., "Caching Memcached at Reconfigurable Network Interface", 24th International Conference on Field Programmable Logic and Applications, Oct. 2014, 6 pages.

Nakamoto, "Bitcoin: A Peer-to-Peer Electronic Cash System," www.bitcoin.org, 2005, 9 pages.

PCT International Search Report and Written Opinion in International Application No. PCT/CN2020/071728, dated Apr. 17, 2020, 16 pages (with partial English machine translation).

* cited by examiner

DATA TRANSMISSION AND NETWORK INTERFACE CONTROLLER

CROSS-REFERENCE TO RELATED APPLICATIONS

This application is a continuation of U.S. patent application Ser. No. 16/809,273, filed on Mar. 4, 2020, with is a continuation of PCT Application No. PCT/CN2020/071728, filed on Jan. 13, 2020, which claims priority to Chinese Patent Application No. 201910624819.8, filed on Jul. 11, 2019, and each application is hereby incorporated by reference in its entirety.

TECHNICAL FIELD

Implementations of the present disclosure relate to the field of information technologies, and more specifically, to data transmission methods, remote direct memory access (RDMA) network interface controllers, and computing devices.

BACKGROUND

RDMA technology can directly move data from a storage area of one host to a storage area of another host without involving an operating system and a central processing unit (CPU), thereby greatly reducing a data processing delay and improving transmission performance. Accelerating network data transmission by using the RDMA technology is a topic of research.

SUMMARY

Considering problems in the existing technology, implementations of the present specification provide data transmission methods, RDMA network interface controllers (RNICs), and computing devices.

According to one aspect, an implementation of the present specification provides a data transmission method, where the method is executed by a first RDMA network interface controller of a first host, and the method includes: obtaining m to-be-sent data packets from a host memory of the first host, where m is a positive integer; sending the m data packets to a second RDMA network interface controller of a second host, and backing up the m data packets to a network interface controller memory integrated into the first RDMA network interface controller; if determining that the second RDMA network interface controller does not receive n data packets in the m data packets, obtaining the backed-up n data packets from the network interface controller memory, where n is a positive integer; and retransmitting the backed-up n data packets to the second RDMA network interface controller.

According to another aspect, an implementation of the present specification provides a data transmission method, where the method is executed by a second RDMA network interface controller of a second host, and the method includes: communicating with a first RDMA network interface controller of a first host, so as to receive m data packets from the first RDMA network interface controller, where the m data packets are backed up by the first RDMA network interface controller to a first network interface controller memory integrated into the first RDMA network interface controller, and m is a positive integer; and if determining that n data packets in the m data packets are not received, performing the following operations: storing received data packets in the m data packets into a second network interface controller memory integrated into the second RDMA network interface controller; waiting to receive the n data packets retransmitted by the first RDMA network interface controller, where the retransmitted n data packets are obtained by the first RDMA network interface controller from the first network interface controller memory, and n is a positive integer; and after the retransmitted n data packets are received, transmitting the received data packets together with the retransmitted n data packets to a host memory of the second host.

According to another aspect, an implementation of the present specification provides an RDMA network interface controller, where the RDMA network interface controller is located in a first host, and the RDMA network interface controller includes a first acquisition unit, a backup unit, a sending unit, and a second acquisition unit; the first acquisition unit is configured to obtain m to-be-sent data packets from a host memory of the first host, where m is a positive integer; the backup unit is configured to back up the m data packets to a network interface controller memory integrated into the RDMA network interface controller; the sending unit is configured to send the m data packets to a second RDMA network interface controller of a second host; the second acquisition unit is configured to: if it is determined that the second RDMA network interface controller does not receive n data packets in the m data packets, obtain the backed-up n data packets from the network interface controller memory, where n is a positive integer; and the sending unit is further configured to retransmit the backed-up n data packets to the second RDMA network interface controller.

According to another aspect, an implementation of the present specification provides an RDMA network interface controller, where the RDMA network interface controller is located in a second host, and the RDMA network interface controller includes: a communications unit, configured to communicate with a first RDMA network interface controller of a first host, so as to receive m data packets from the first RDMA network interface controller, where the m data packets are backed up by the first RDMA network interface controller to a first network interface controller memory integrated into the first RDMA network interface controller, and m is a positive integer; a data packet management unit, configured to: if it is determined that n data packets in the m data packets are not received, perform the following operations: storing received data packets in the m data packets into a second network interface controller memory integrated into the RDMA network interface controller, and waiting to receive the n data packets retransmitted by the first RDMA network interface controller, where the retransmitted n data packets are obtained by the first RDMA network interface controller from the first network interface controller memory, and n is a positive integer; and a transmission unit, configured to: after the communications unit receives the retransmitted n data packets, transmit the received data packets together with the retransmitted n data packets to a host memory of the second host.

According to another aspect, an implementation of the present specification provides a computing device, including a top-layer application, a host memory, and an RDMA network interface controller, where the top-layer application stores m to-be-sent data packets into the host memory, and sends instructions associated with the m data packets to the RDMA network interface controller, where m is a positive integer; and the RDMA network interface controller is integrated with a network interface controller memory and implements, based on the instructions, the method executed by the first RDMA network interface controller.

According to another aspect, an implementation of the present specification provides a computing device, including a top-layer application, a host memory, and an RDMA network interface controller. The RDMA network interface controller is integrated with a network interface controller memory and implements the method executed by the second RDMA network interface controller. The RDMA network interface controller sends, to the top-layer application, instructions associated with m data packets transmitted to the host memory, where m is a positive integer; and the top-layer application processes the m data packets based on the instructions.

In this technical solution, because the RDMA network interface controller can back up the to-be-sent data packet in the network interface controller memory integrated in the RDMA network interface controller, when retransmission is required, the to-be-retransmitted data packet can be quickly obtained without accessing the host memory again. Therefore, not only bandwidth (for example, PCIe bandwidth) occupation of the host can be reduced, but also retransmission efficiency and retransmission performance can be greatly improved. As such, a packet loss tolerance capability of the RDMA network interface controller can be significantly enhanced, so the RDMA technology can be effectively implemented on a lossy network.

BRIEF DESCRIPTION OF DRAWINGS

By describing the implementations of the present specification in more detail with reference to the accompanying drawings, the previous and other objectives, features, and advantages of the implementations of the present specification become clearer. In the implementations of the present specification, the same reference numerals usually represent the same elements.

DESCRIPTION OF IMPLEMENTATIONS

The subject matter described in the present specification will be discussed with reference to implementations. It should be understood that these implementations are merely discussed to enable a person skilled in the art to better understand and implement the subject matter described in the present specification, and are not intended to limit the protection scope, applicability, or examples described in the claims. The functions and arrangements of the elements under discussion can be changed without departing from the protection scope of the claims. Various processes or components can be omitted, replaced, or added in the implementations as needed.

In the RDMA technology, because an operating system and a CPU do not need to participate in a data migration process, using the RDMA technology to accelerate network data transmission is gradually becoming one of the hot research topics.

Currently, the RDMA technology is usually implemented on a hardware network interface controller, and this network interface controller can be referred to as an RDMA network interface controller. The RDMA network interface controller can be usually connected to a host memory by using a peripheral component interconnect express (PCIe), so as to implement direct access to the host memory. Costs of accessing the host memory by the network interface controller by using the PCIe are usually relatively high. Therefore, the RDMA technology currently used in the industry usually requires that a network is lossless (that is, the network does not lose a packet). This is because when a packet is lost, the RDMA network interface controller needs to retransmit all subsequent data packets after the lost data packet, and the RDMA network interface controller needs to obtain these data packets from the host memory again by using the PCIe, which seriously affects data transmission efficiency. Therefore, the probability of such retransmission can be greatly reduced by ensuring that the network is lossless.

However, the current objective of ensuring that a network is lossless is generally achieved by enabling a flow control mechanism in a data center. But, enabling flow control greatly increases operation and maintenance costs of the data center, and also brings potential problems (for example, congestion diffusion). In addition, even if flow control is enabled, it is still difficult to fully avoid packet loss due to factors such as bit errors on a physical link. Therefore, it is desirable to improve the tolerance of the RDMA technology to packet loss.

In view of this, the present specification provides a technical solution for data transmission. In the present specification, for ease of description, a host that sends data is referred to as a first host, and a host that receives data is referred to as a second host.

The first host can include a first RDMA network interface controller used to implement the RDMA technology, and can further include a host memory. For example, the first RDMA network interface controller can connect to the host memory of the first host by using a PCIe, so as to access data on the host memory. In addition, the first RDMA network interface controller can further have a programmable function, for example, have a field programmable gate array (FPGA). For example, the FPGA is programmed, so the first RDMA network interface controller can implement various operations described in the present specification.

The second host can also include a second RDMA network interface controller used to implement the RDMA technology and a host memory. For example, the second RDMA network interface controller can connect to the host memory of the second host by using a PCIe, so as to access data on the host memory. The second RDMA network interface controller can also have a programmable function, for example, have an FPGA. For example, the FPGA is programmed, so the second RDMA network interface controller can implement various operations described in the present specification.

In addition, the first RDMA network interface controller and the second RDMA network interface controller can communicate with each other, so as to implement data transmission.

The first RDMA network interface controller can be integrated with a memory. For ease of description, the memory is referred to as a network interface controller memory in the present specification. For example, the network interface controller memory can be a dynamic random access memory (DRAM) or any other applicable memory. This is not limited in the present specification. The network interface controller memory of the first RDMA network interface controller can be configured to back up a to-be-sent data packet. As such, when retransmission needs to be performed, the first RDMA network interface controller can directly obtain the backed-up data packet from the network interface controller memory, and does not need to obtain the to-be-retransmitted data packet from the host memory again by using the PCIe.

It can be seen that in this technical solution, because the RDMA network interface controller can back up the to-be-sent data packet in the network interface controller memory integrated in the RDMA network interface controller, when retransmission is required, the to-be-retransmitted data packet can be quickly obtained without accessing the host memory again. Therefore, not only bandwidth (for example, PCIe bandwidth) occupation of the host can be reduced, but also retransmission efficiency and retransmission performance can be greatly improved. As such, a packet loss tolerance capability of the RDMA network interface controller can be significantly enhanced, so the RDMA technology can be effectively implemented on a lossy network.

In addition, by backing up data in the network interface controller memory of the RDMA network interface controller, a sliding window and a flow control mechanism can be implemented at a hardware level, thereby reducing impact of RDMA traffic on the network and reducing the probability of network congestion.

In addition, the second RDMA network interface controller can be integrated with a network interface controller memory. The network interface controller memory of the second RDMA network interface controller can be configured to cache a received data packet. For example, when a packet loss occurs, the second RDMA network interface controller can cache the received data packet into the network interface controller memory. When the retransmitted data packet is received, the retransmitted data packet and the previously received data packet are transmitted together to the host memory of the second host. As such, the first RDMA network interface controller can retransmit only a lost data packet, and does not need to retransmit all subsequent data packets. Therefore, the number of data packets to be retransmitted can be greatly reduced, thereby effectively shortening a retransmission time and improving retransmission performance.

The following describes the technical solutions of the present specification with reference to specific implementations.

Figure 1:
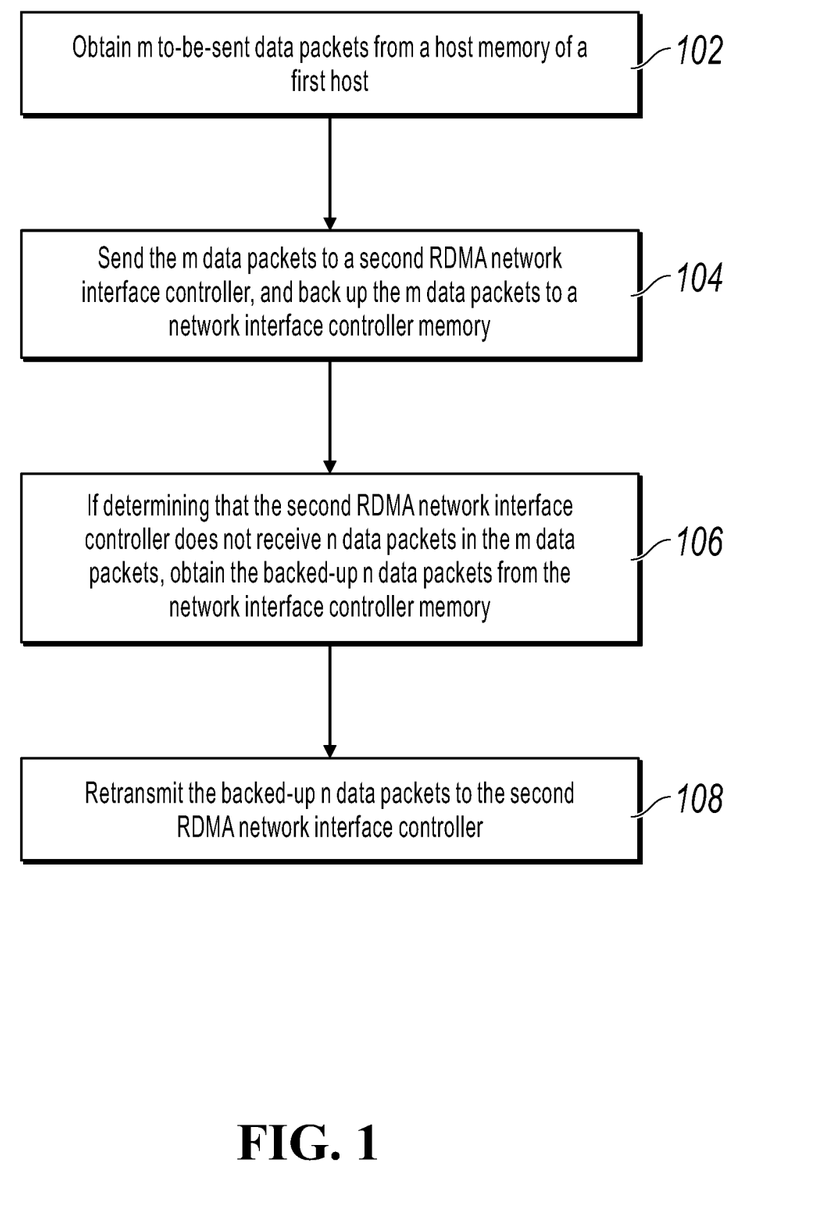
FIG. 1 is a schematic flowchart illustrating a data transmission method, according to an implementation.

FIG. 1 is a schematic flowchart illustrating a data transmission method, according to an implementation. For example, the method in FIG. 1 can be performed by a first RDMA network interface controller of a first host.

As shown in FIG. 1, in step 102, the first RDMA network interface controller can obtain m to-be-sent data packets from a host memory of the first host, m is a positive integer.

In step 104, the first RDMA network interface controller can send the m data packets to a second RDMA network interface controller of a second host, and back up the m data packets to a network interface controller memory integrated into the first RDMA network interface controller.

In step 106, if the first RDMA network interface controller determines that the second RDMA network interface controller does not receive n data packets in the m data packets, the first RDMA network interface controller can obtain the backed-up n data packets from the network interface controller memory, where n is a positive integer.

In step 108, the first RDMA network interface controller can retransmit the backed-up n data packets to the second RDMA network interface controller.

It can be seen that in this technical solution, because the RDMA network interface controller can back up the to-be-sent data packet in the network interface controller memory integrated in the RDMA network interface controller, when retransmission is required, the to-be-retransmitted data packet can be quickly obtained without accessing the host memory again. Therefore, not only bandwidth (for example, PCIe bandwidth) occupation of the host can be reduced, but also retransmission efficiency and retransmission performance can be greatly improved. As such, a packet loss tolerance capability of the RDMA network interface controller can be significantly enhanced, so the RDMA technology can be effectively implemented on a lossy network.

In this solution, a sliding window and a flow control mechanism are actually implemented at a hardware level, thereby reducing impact of RDMA traffic on a network and reducing the probability of network congestion.

In an implementation, in step 102, when the m data packets need to be sent to the second host, a top-layer application of the first host can store the m data packets in the host memory of the first host. In addition, the top-layer application can send, to the first RDMA network interface controller, instructions about the data packets that need to be sent. When receiving the instruction, the first RDMA network interface controller can obtain the m to-be-sent data packets from the host memory of the first host.

In an implementation, in step 104, the first RDMA network interface controller can send the m data packets to the second RDMA network interface controller of the second host. In addition, the first RDMA network interface controller can back up the m data packets to the network interface controller memory integrated into the first RDMA network interface controller. For example, as described above, the network interface controller memory can be a DRAM or any other suitable type of memory.

Then, the first RDMA network interface controller can determine whether the second RDMA network interface controller receives the m data packets. For example, the first RDMA network interface controller can start a corresponding timer for each sent data packet. If the first RDMA network interface controller receives an Acknowledgement (ACK) response for a corresponding data packet from the second RDMA network interface controller before the timer expires, the first RDMA network interface controller can determine that the second RDMA network interface controller has received the corresponding data packet. When the timer expires, if the first RDMA network interface controller does not receive the ACK response for the corresponding data packet from the second RDMA network interface controller, the first RDMA network interface controller can consider that the second RDMA network interface controller does not receive the corresponding data packet.

For another example, the second RDMA network interface controller can return a Negative-Acknowledgement (NACK) response to the first RDMA network interface controller for a data packet that is not received. As such, the first RDMA network interface controller can determine, based on the NACK response, which data packets are not received by the second RDMA network interface controller.

It should be understood that the ACK response or NACK response for the data packet can be implemented in multiple forms. For example, one message indicating an ACK or NACK response can be sent for each data packet. Or one message can be sent for several data packets, and the message can include ACK or NACK responses respectively corresponding to the data packets.

For example, in the previous technical solution, the first RDMA network interface controller can determine that the second RDMA network interface controller does not receive the n data packets in the m data packets. As described above, in an implementation, if the first RDMA network interface controller does not receive ACK responses for the n data packets from the second RDMA network interface controller within predetermined duration, the first RDMA network interface controller can determine that the second RDMA network interface controller does not receive the n data packets. For example, the predetermined duration can be duration of a timer for each of the n data packets. The predetermined duration can be determined in advance based on various factors such as an actual application scenario.

In another implementation, the first RDMA network interface controller can receive NACK responses for the n data packets from the second RDMA network interface controller. As such, the first RDMA network interface controller can determine that the second RDMA network interface controller does not receive the n data packets.

There can be multiple reasons why the second RDMA network interface controller does not receive the data packets. For example, the data packets are lost in the network transmission process, or the data packets cannot be successfully received due to a bit error or an insufficient receiving capability of the second host.

In this case, the first RDMA network interface controller needs to retransmit the n data packets that are not successfully received to the second RDMA network interface controller. In this case, because the first RDMA network interface controller backs up the m data packets that have been sent in the network interface controller memory of the first RDMA network interface controller, the first RDMA network interface controller can directly obtain the n data packets to be retransmitted from the network interface controller memory of the first RDMA network interface controller without needing to access the host memory of the first host again by using, for example, a PCIe. As such, not only bandwidth occupation on the host can be reduced, but also time required for obtaining the to-be-retransmitted data packet can be greatly shortened, so retransmission efficiency can be improved, and a packet loss tolerance capability of the RDMA network interface controller is effectively enhanced.

In addition, when determining that the second RDMA network interface controller has received the m data packets, the first RDMA network interface controller can delete the backed-up m data packets from the network interface controller memory.

For example, if the first RDMA network interface controller receives ACK responses for the m data packets from the second RDMA network interface controller after the first time of transmission, the first RDMA network interface controller can determine that the second RDMA network interface controller has received the m data packets. In this case, the first RDMA network interface controller can delete the backed-up m data packets from the network interface controller memory.

For another example, after retransmission, if the first RDMA network interface controller receives ACK responses for the n retransmitted data packets from the second RDMA network interface controller, the first RDMA network interface controller can confirm that the second RDMA network interface controller has received all the m data packets, and the first RDMA network interface controller can delete the backed-up m data packets from the network interface controller memory.

It can be seen that the previous technical solution actually provides a sliding window mechanism and a flow control mechanism at a hardware level of the network interface controller, so efficient data retransmission can be implemented.

FIG. 1 is described from the perspective of the RDMA network interface controller at the transmitting end. The following describes the operation of the RDMA network interface controller at the receiving end.

Figure 2:
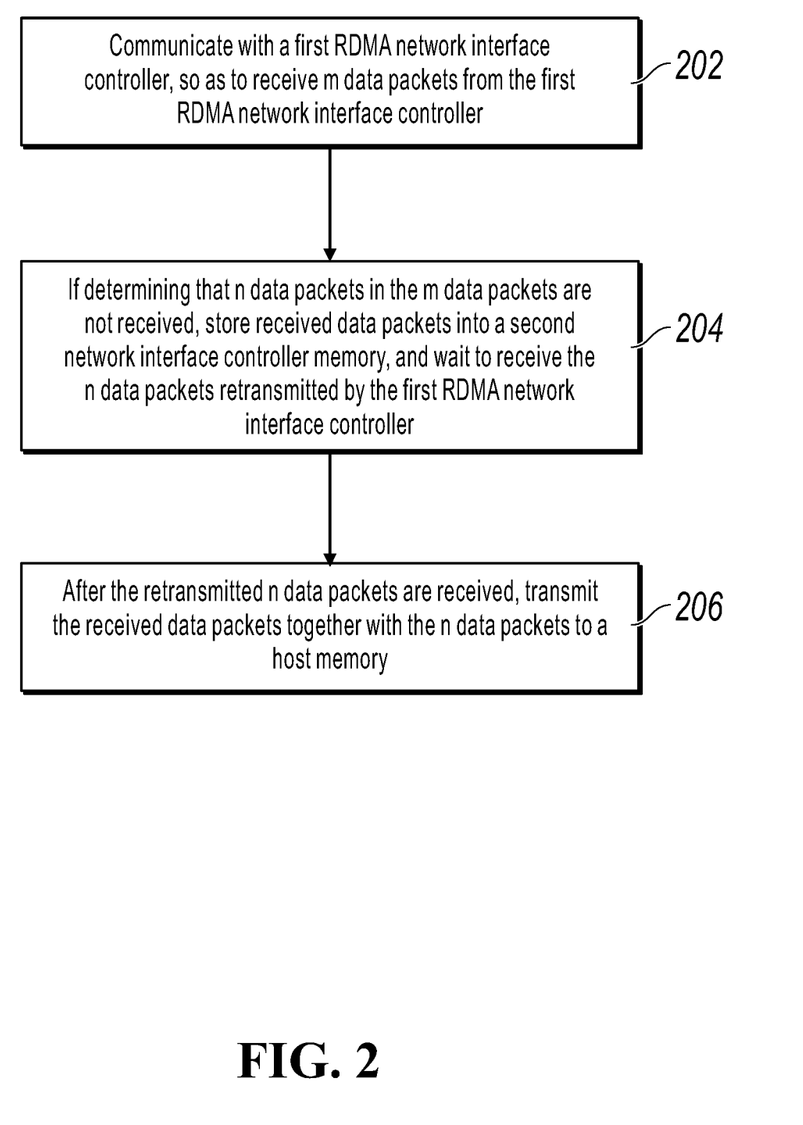
FIG. 2 is a schematic flowchart illustrating a data transmission method, according to an implementation.

FIG. 2 is a schematic flowchart illustrating a data transmission method, according to an implementation. For example, the method in FIG. 2 can be performed by a second RDMA network interface controller of a second host. In this implementation, for ease of description, a network interface controller memory integrated into a first RDMA network interface controller of a first host is referred to as a first network interface controller memory, and a network interface controller memory integrated into the second RDMA network interface controller of the second host is referred to as a second network interface controller memory.

As shown in FIG. 2, in step 202, the second RDMA network interface controller can communicate with the first RDMA network interface controller of the first host, so as to receive m data packets from the first RDMA network interface controller.

The m data packets can be backed up by the first RDMA network interface controller to the first network interface controller memory. For example, the first RDMA network interface controller can back up the m data packets to the first network interface controller memory while sending the m data packets, where m can be a positive integer.

In step 204, if the second RDMA network interface controller determines that n data packets in the m data packets are not received, the second RDMA network interface controller can store received data packets in the m data packets into the second network interface controller memory, and can wait to receive the n data packets retransmitted by the first RDMA network interface controller. The retransmitted n data packets can be obtained by the first RDMA network interface controller from the first network interface controller memory, and n can be a positive integer.

In step 206, after receiving the retransmitted n data packets, the second RDMA network interface controller can transmit, together with the n data packets, the previously received data packets stored in the second network interface controller memory to a host memory of the second host.

In this technical solution, because the network interface controller memory is integrated into the second RDMA network interface controller, the second RDMA network interface controller can store the received data packets in the network interface controller memory when waiting for the to-be-retransmitted data packets, and can send all the received data packets to the host memory after receiving all the data packets. As such, the first RDMA network interface controller can retransmit only data packets that are not received by the second RDMA network interface controller, and does not need to retransmit all data packets subsequent to a lost data packet, thereby effectively reducing the number of data packets to be retransmitted, and effectively improving retransmission efficiency.

In addition, because the first RDMA network interface controller can back up the to-be-sent data packets in the network interface controller memory integrated into the first RDMA network interface controller, it is unnecessary for the first RDMA network interface controller to access the host memory again during retransmission. Therefore, not only bandwidth occupation of the host can be reduced, but also retransmission efficiency and retransmission performance can be greatly improved.

Therefore, in this technical solution, a packet loss tolerance capability of the RDMA network interface controller can be greatly enhanced, so the RDMA technology can be effectively implemented on a lossy network.

In an implementation, the first network interface controller memory can be a DRAM or any other suitable type of memory. The second network interface controller memory can be a DRAM or any other suitable type of memory.

The second RDMA network interface controller can detect, in multiple ways, whether the m data packets are received. For example, the m data packets can have a certain sequence, and each data packet can include a corresponding sequence number. The second RDMA network interface controller can determine, based on sequence numbers in the received data packets, whether the m data packets have been received.

For example, the second RDMA network interface controller can determine that the n data packets in the m data packets are not received. In an implementation, the second RDMA network interface controller can send NACK responses for the n data packets to the first RDMA network interface controller. In another implementation, the second RDMA network interface controller may not send ACK responses for the n data packets. For example, the first RDMA network interface controller can determine that no ACK response for a data packet is received from the second RDAM network interface controller within predetermined duration for the data packet, and can consider that the second RDMA network interface controller does not receive the data packet.

It can be seen that the previous technical solution provides a mechanism for efficient data retransmission between RDMA network interface controllers.

The following describes the technical solutions of the present specification with reference to specific examples. It should be understood that the following examples are merely intended to help a person skilled in the art better understand the previous technical solutions, rather than limit their scope.

Figure 3A:
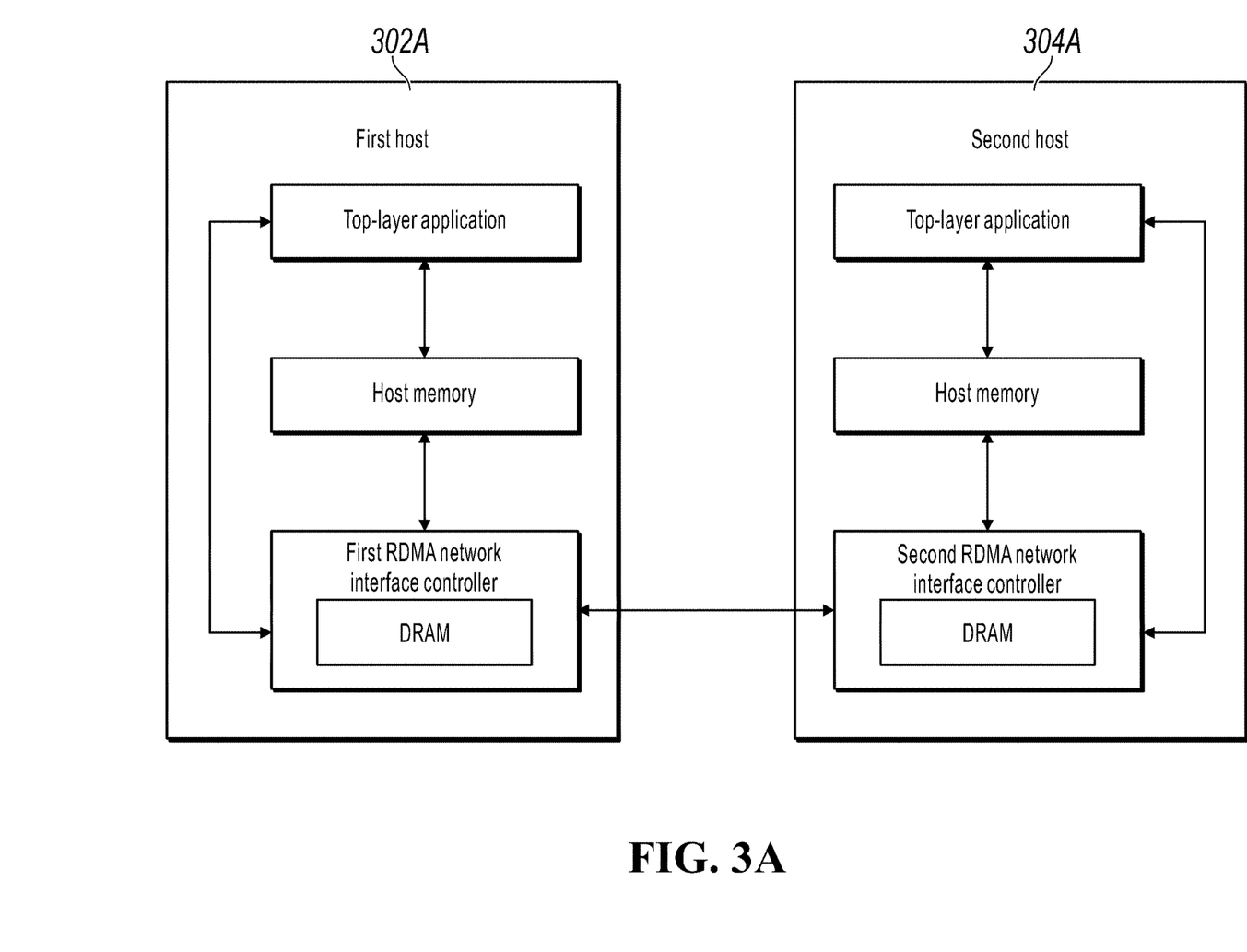
FIG. 3A is a schematic diagram illustrating an example of a data transmission scenario, according to an implementation.

FIG. 3A is a schematic diagram illustrating an example of a data transmission scenario, according to an implementation.

As shown in FIG. 3A, a first host 302A can include a top-layer application, a host memory, and a first RDMA network interface controller.

For example, the top-layer application of the first host can store to-be-sent data packets in the host memory of the first host, and can send instructions about the to-be-sent data packets to the first RDMA network interface controller. The first RDMA network interface controller can obtain the to-be-sent data packets from the host memory of the first host, and can send the obtained data packets to a second RDMA network interface controller. In addition, the first RDMA network interface controller can back up the obtained data packets to a DRAM integrated into the first RDMA network interface controller. If retransmission needs to be performed, the first RDMA network interface controller can obtain to-be-retransmitted data packets from the DRAM of the first RDMA network interface controller.

A second host 304A can include a top-layer application, a host memory, and the second RDMA network interface controller.

For example, the second RDMA network interface controller can receive data packets from the first RDMA network interface controller. If there is a data packet not received, the second RDMA network interface controller can temporarily store received data packets into a DRAM integrated into the second RDMA network interface controller. Then, the second RDMA network interface controller can receive the retransmitted data packet from the first RDAM network interface controller. After receiving all the data packets, the second RDAM network interface controller can send all the data packets to the host memory of the second host. Then, the second RDAM network interface controller can notify the top-layer application of the second host of completion of data transmission, for example, send an interrupt instruction to the top-layer application. Then, the top-layer application of the second host can process the corresponding data packets in the host memory.

It should be understood that, for ease of description, the first host and the second host are shown as including three parts in the example in FIG. 3A. However, in specific implementation, the first host and the second host can further include other related parts that are known in the art. This is not limited in the present specification.

Figure 3B:
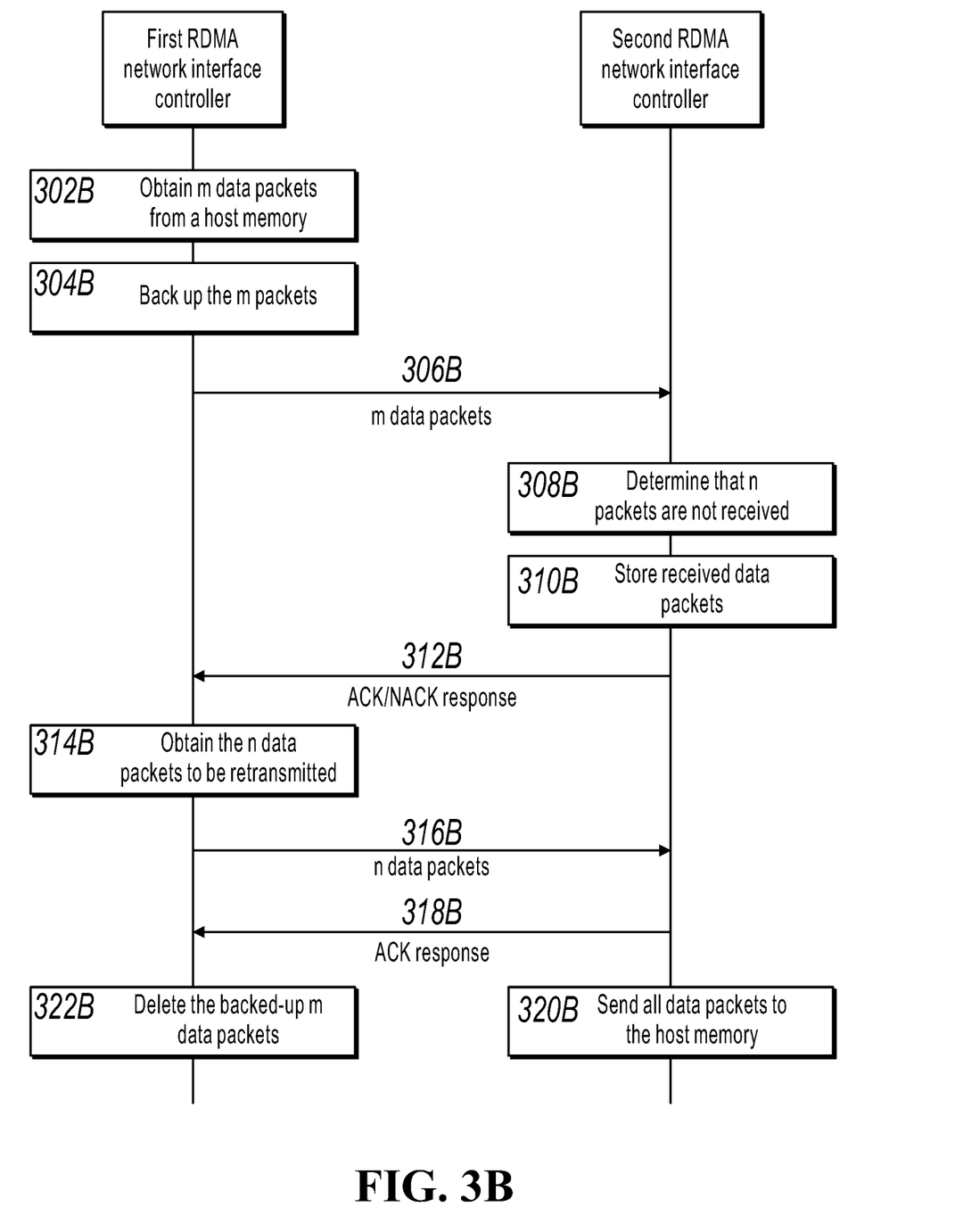
FIG. 3B is a schematic flowchart illustrating a data transmission process, according to an implementation.

The following describes specific operations of the first RDMA network interface controller and the second RDMA network interface controller in FIG. 3A with reference to a procedure in FIG. 3B. It should be understood that the procedure shown in FIG. 3B is only an example, and the scope of the technical solution in the present specification is not limited.

FIG. 3B is a schematic flowchart illustrating a data transmission process, according to an implementation.

As shown in FIG. 3B, in step 302B, a first RDMA network interface controller can obtain m to-be-sent data packets from a host memory of a first host.

In step 304B, the first RDMA network interface controller can back up the m data packets to a DRAM integrated into the first RDMA network interface controller.

In step 306B, the first RDMA network interface controller can send the m data packets to a second RDMA network interface controller.

It should be understood that although step 304B is first performed and then step 306B is performed, in different scenarios, steps 304B and 306B can be performed in parallel. Or step 306B can be performed before step 304B. This is not limited in the present specification.

In step 308B, the second RDMA network interface controller can determine that n data packets are not received.

In step 310B, the second RDMA network interface controller can store received data packets in the m data packets into a DRAM integrated into the second RDMA network interface controller.

In step 312B, the second RDMA network interface controller can send ACK responses for the received data packets and NACK responses for the n data packets that are not received to the first RDMA network interface controller.

It should be understood that although step 310B is first performed and then step 312B is performed, in different scenarios, steps 310B and 312B can be performed in parallel. Or step 312B can be performed before step 310B. This is not limited in the present specification.

In step 314B, the first RDMA network interface controller can obtain the n data packets to be retransmitted from the DRAM of the first RDMA network interface controller.

In step 316B, the first RDMA network interface controller can send the n data packets obtained in step 314B to the second RDMA network interface controller.

In step 318B, the second RDMA network interface controller can determine that the n data packets are received, and send ACK responses for the n data packets to the first RDMA network interface controller.

In step 320B, the second RDMA network interface controller can transmit the previously received data packets stored in the DRAM of the second RDMA network interface controller together with the n data packets received in step 316B to a host memory of a second host.

In step 322B, the first RDMA network interface controller can determine that the second RDMA network interface controller has received all the m data packets, and delete the backed-up m data packets from the network interface controller memory of the first RDMA network interface controller.

It can be seen that in this technical solution, the transmitting end RDMA network interface controller can back up the to-be-sent data packets in the network interface controller memory integrated into the transmitting end RDMA network interface controller, and the receiving end RDMA network interface controller can temporarily store the received data packets in the network interface controller memory integrated into the receiving end RDMA network interface controller when waiting for the to-be-retransmitted data packets. Therefore, the transmitting end RDMA network interface controller can quickly obtain and retransmit the data packets not received by the receiving end RDMA network interface controller, thereby greatly improving retransmission efficiency and retransmission performance. In this technical solution, a packet loss tolerance capability of the RDMA network interface controller can be significantly enhanced, so the RDMA technology can be effectively implemented on a lossy network.

Figure 4:
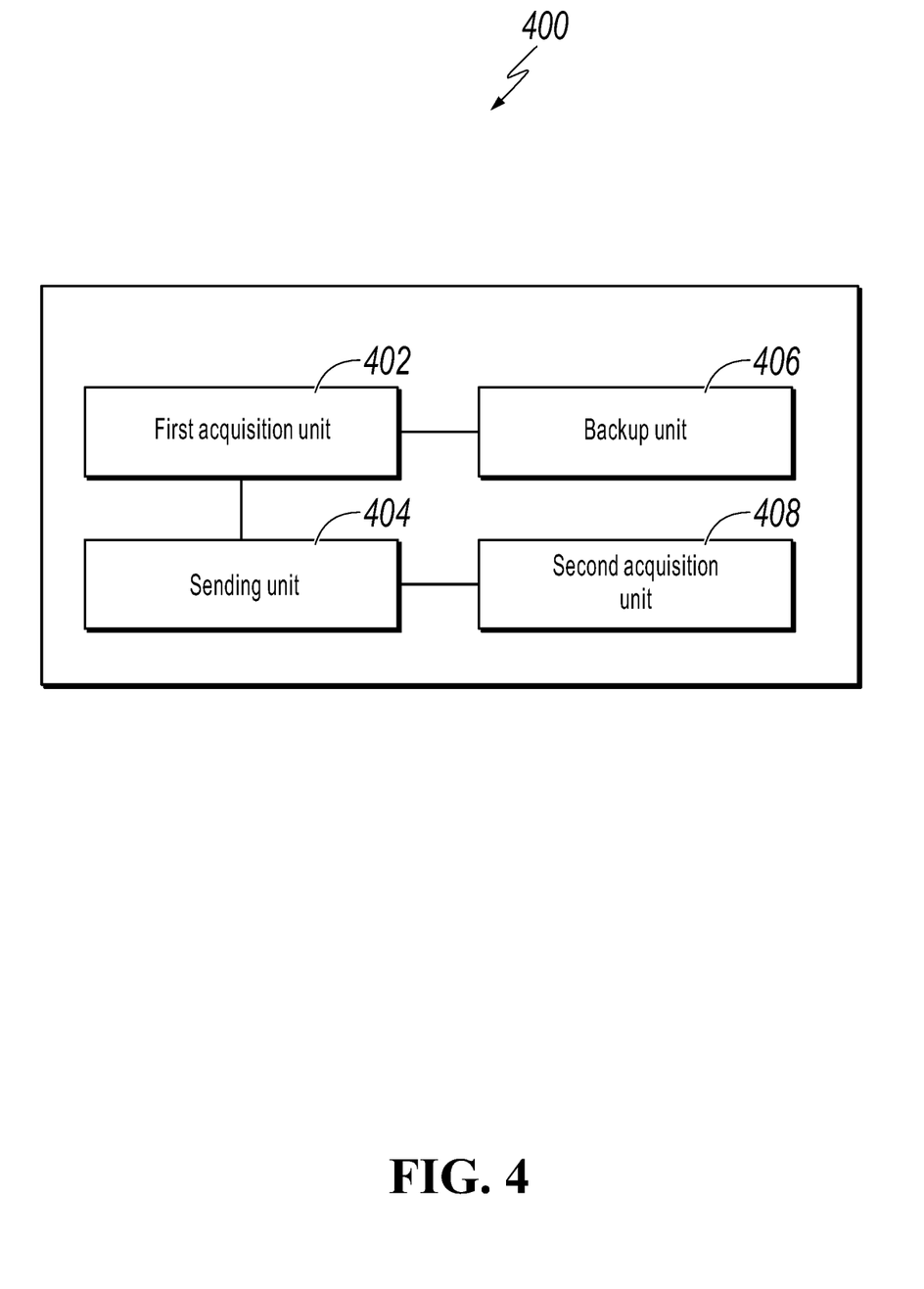
FIG. 4 is a schematic block diagram illustrating an RDMA network interface controller, according to an implementation.

FIG. 4 is a schematic block diagram illustrating an RDMA network interface controller, according to an implementation. For example, an RDMA network interface controller 400 in FIG. 4 can be the previous first RDMA network interface controller. For example, the RDMA network interface controller 400 can be implemented by combining software and hardware.

The RDMA network interface controller 400 can include a first acquisition unit 402, a sending unit 404, a backup unit 406, and a second acquisition unit 408.

The first acquisition unit 402 can obtain m to-be-sent data packets from a host memory of a first host, where m is a positive integer. The sending unit 404 can send the m data packets to a second RDMA network interface controller of a second host. The backup unit 406 can back up the m data packets to a network interface controller memory integrated into the RDMA network interface controller 400.

If the second acquisition unit 408 determines that the second RDMA network interface controller does not receive n data packets in the m data packets, the second acquisition unit 408 obtains the backed-up n data packets from the network interface controller memory, where n is a positive integer.

The sending unit 404 can retransmit the backed-up n data packets to the second RDMA network interface controller.

It can be seen that in this technical solution, because the RDMA network interface controller can back up the to-be-sent data packet in the network interface controller memory integrated in the RDMA network interface controller, when retransmission is required, the to-be-retransmitted data packet can be quickly obtained without accessing the host memory again. Therefore, not only bandwidth (for example, PCIe bandwidth) occupation of the host can be reduced, but also retransmission efficiency and retransmission performance can be greatly improved. As such, a packet loss tolerance capability of the RDMA network interface controller can be significantly enhanced, so the RDMA technology can be effectively implemented on a lossy network.

In an implementation, the network interface controller memory can be a DRAM.

In an implementation, the second acquisition unit 408 can determine that no ACK response for the n data packets is received from the second RDMA network interface controller within predetermined duration. Or the second acquisition unit 408 can determine that NACK responses for the n data packets are received from the second RDMA network interface controller.

In an implementation, if the backup unit 406 determines that the second RDMA network interface controller has received the m data packets, the backup unit 406 can delete the backed-up m data packets from the network interface controller memory.

Units of the RDMA network interface controller 400 can perform corresponding steps in the implementations shown in FIG. 1 and FIG. 3A and FIG. 3B. Therefore, for brevity of description, specific operations and functions of the units of the RDMA network interface controller 400 are not described here again.

Figure 5:
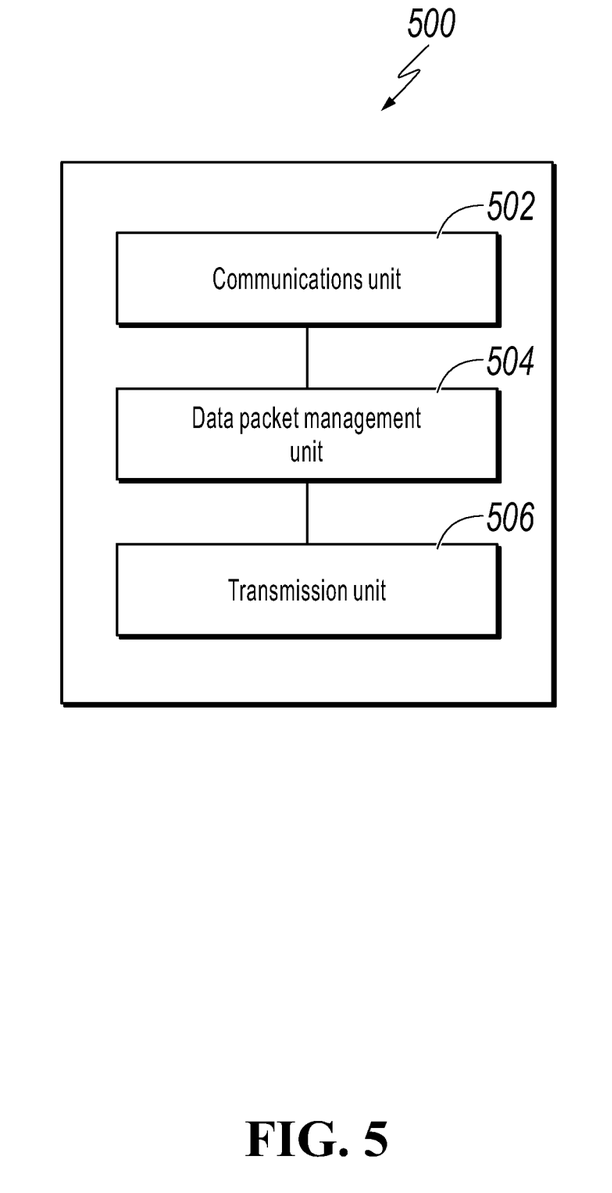
FIG. 5 is a schematic block diagram illustrating an RDMA network interface controller, according to an implementation.

FIG. 5 is a schematic block diagram illustrating an RDMA network interface controller, according to an implementation. For example, an RDMA network interface controller 500 in FIG. 5 can be the previous second RDMA network interface controller. For example, the RDMA network interface controller 500 can be implemented by combining software and hardware.

The RDMA network interface controller 500 can include a communications unit 502, a data packet management unit 504, and a data packet management unit 506.

The communications unit 502 can communicate with a first RDMA network interface controller of a first host, so as to receive m data packets from the first RDMA network interface controller, where the m data packets are backed up by the first RDMA network interface controller to a first network interface controller memory integrated into the first RDMA network interface controller, and m is a positive integer.

If the data packet management unit 504 determines that the communications unit 502 does not receive n data packets in the m data packets, the data packet management unit 504 can store received data packets in the m data packets into a second network interface controller memory integrated into the RDMA network interface controller 500, and can wait to receive the n data packets by the first RDMA network interface controller, where the retransmitted n data packets are obtained by the first RDMA network interface controller from the first network interface controller memory, and n is a positive integer.

After the communications unit 502 receives the retransmitted n data packets, the data packet management unit 504 transmits the received data packets together with the retransmitted n data packets to a host memory of a second host.

In this technical solution, because the network interface controller memory is integrated into the receiving end RDMA network interface controller, the receiving end RDMA network interface controller can store the received data packets in the network interface controller memory when waiting for the to-be-retransmitted data packets, and can send all the received data packets to the host memory after receiving all the data packets. As such, the first RDMA network interface controller can retransmit only data packets that are not received, and does not need to retransmit all data packets subsequent to a lost data packet, thereby effectively reducing the number of data packets to be retransmitted, and effectively improving retransmission efficiency.

In addition, because the first RDMA network interface controller can back up the to-be-sent data packets in the network interface controller memory integrated into the first RDMA network interface controller, it is unnecessary for the first RDMA network interface controller to access the host memory again during retransmission. Therefore, not only bandwidth occupation of the host can be reduced, but also retransmission efficiency and retransmission performance can be greatly improved.

In an implementation, the first network interface controller memory can be a DRAM. The second network interface controller memory can be a DRAM.

In an implementation, after the data packet management unit 504 determines that the n data packets in the m data packets are not received, the communications unit 502 can send NACK responses for the n data packets to the first RDMA network interface controller, or the communications unit 502 may not send ACK responses for the n data packets to the first RDMA network interface controller.

Units of the RDMA network interface controller 500 can perform corresponding steps in the implementations shown in FIG. 2 to FIG. 3B. Therefore, for brevity of description, specific operations and functions of the units of the RDMA network interface controller 500 are not described here again.

Figure 6:
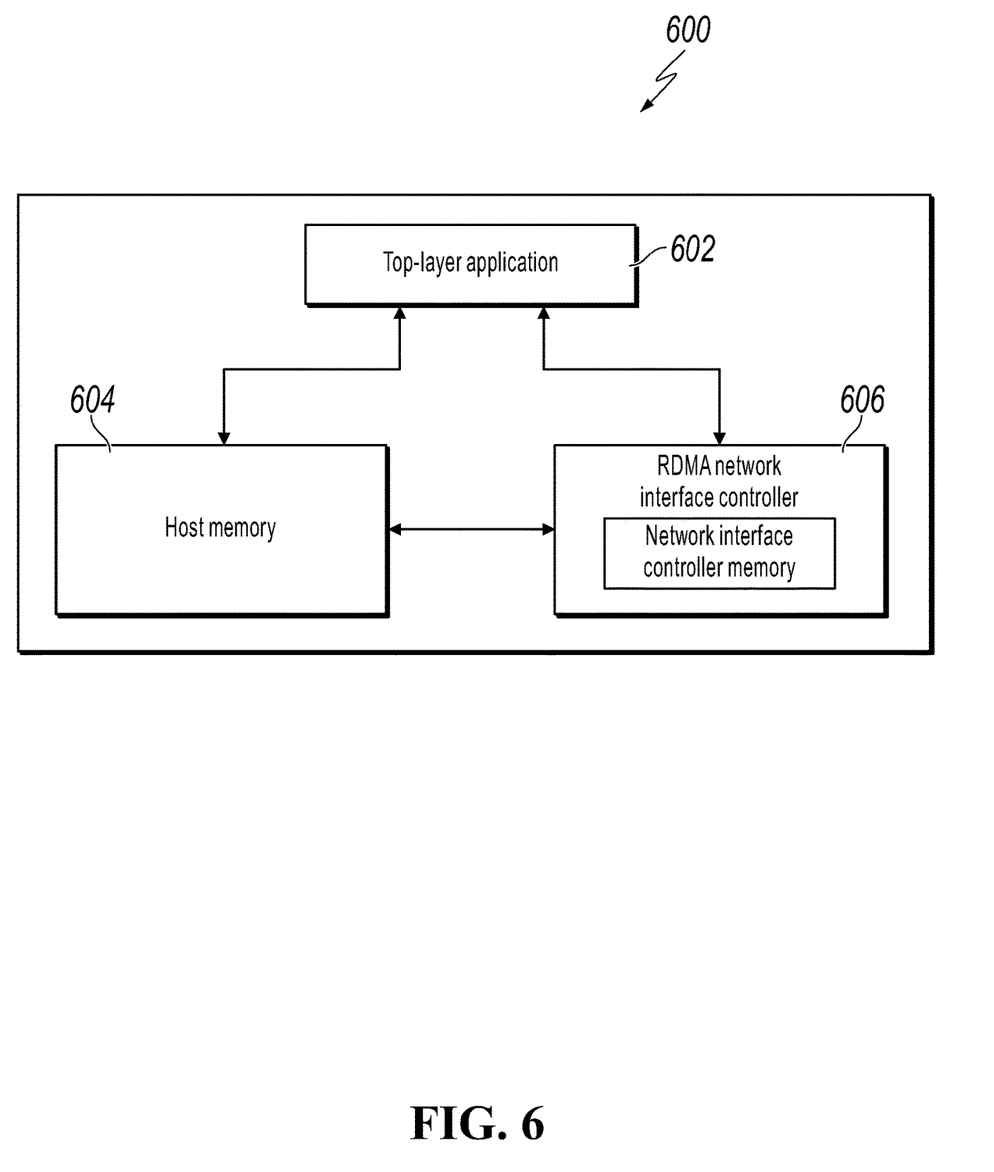
FIG. 6 is a schematic structural diagram illustrating a computing device, according to an implementation.

FIG. 6 is a schematic structural diagram illustrating a computing device, according to an implementation. As shown in FIG. 6, a computing device 600 can include a top-layer application 602, a host memory 604, and an RDMA network interface controller 606. For example, the computing device 600 can be corresponding to the previous first host.

The top-layer application 602 can store m to-be-sent data packets into the host memory 604, and send instructions associated with the m data packets to the RDMA network interface controller 606. For specific functions of the top-layer application 602 and the host memory 604, refer to corresponding descriptions in the previous implementations. Details are omitted here for simplicity.

The RDMA network interface controller 606 is integrated with a network interface controller memory, and can implement functions of the first RDMA network interface controller based on the previous instructions.

The computing device 600 can be implemented in any applicable form in the art, for example, includes but is not limited to a desktop computer, a laptop computer, a smartphone, a tablet computer, a consumer electronic device, a wearable intelligent device, etc.

Figure 7:
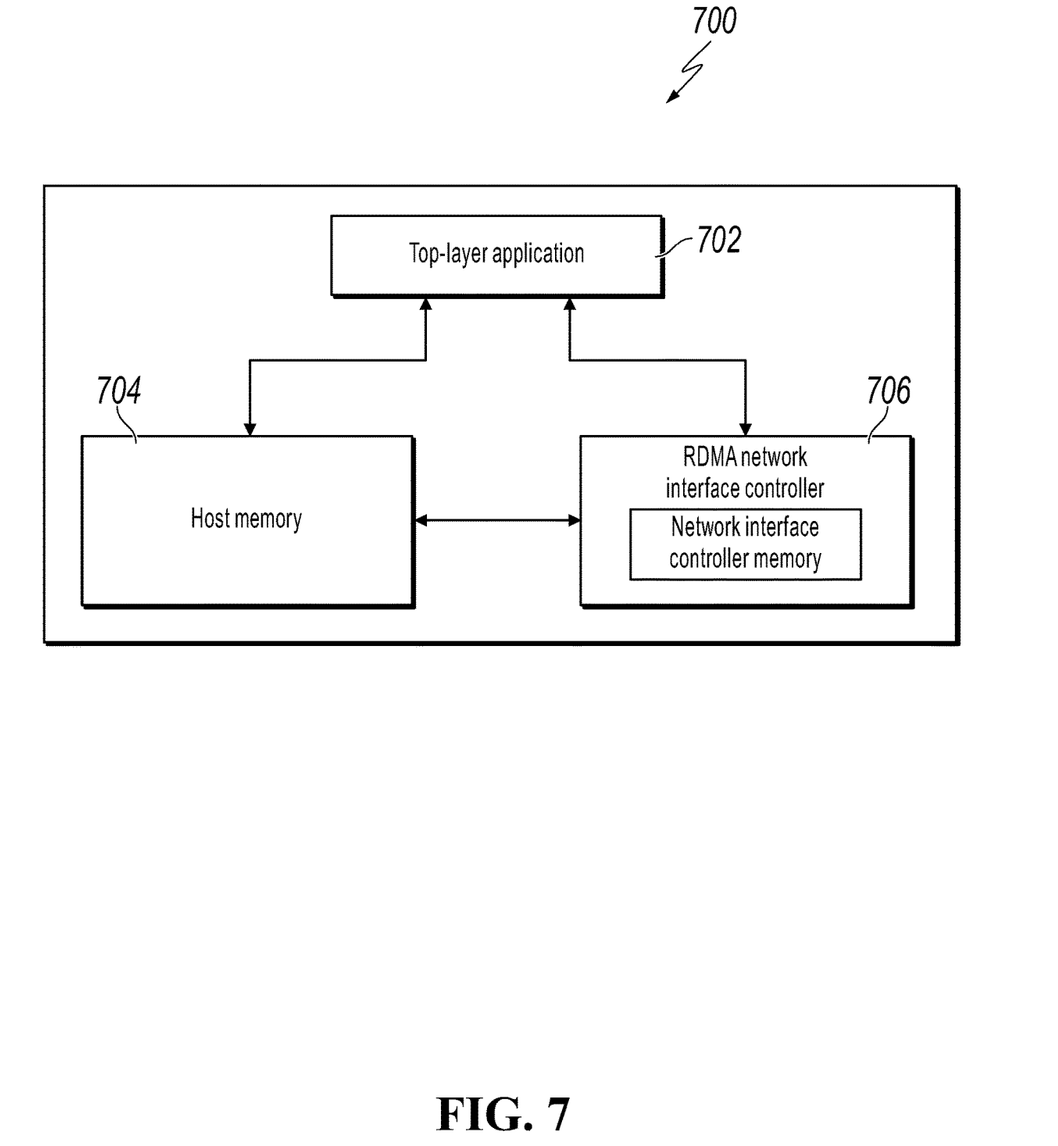
FIG. 7 is a schematic structural diagram illustrating a computing device, according to an implementation.

FIG. 7 is a schematic structural diagram illustrating a computing device, according to an implementation. As shown in FIG. 7, a computing device 700 can include a top-layer application 702, a host memory 704, and an RDMA network interface controller 706. For example, the computing device 700 can be corresponding to the previous second host.

The RDMA network interface controller 706 can be integrated with a network interface controller memory, and can implement functions of the previous second RDMA network interface controller.

In addition, the RDMA network interface controller 706 can send, to the top-layer application, instructions about m data packets transmitted to the host memory 704. The top-layer application processes the m data packets based on the instructions.

For specific functions of the top-layer application 702 and the host memory 704, refer to corresponding descriptions in the previous implementations. Details are omitted here for simplicity.

The computing device 700 can be implemented in any applicable form in the art, for example, includes but is not limited to a desktop computer, a laptop computer, a smartphone, a tablet computer, a consumer electronic device, a wearable intelligent device, etc.

The implementations in the present specification are described in a progressive way. For same or similar parts of the implementations, references can be made to the implementations mutually. Each implementation focuses on a difference from other implementations. Especially, an apparatus implementation, a device implementation, a non-volatile computer storage medium implementation are similar to a method implementation, and therefore are described briefly. For related parts, references can be made to the descriptions in the method implementation.

Specific implementations of the present specification are described above. Other implementations fall within the scope of the appended claims. In some situations, the actions or steps described in the claims can be performed in an order different from the order in the implementations and the desired results can still be achieved. In addition, the process depicted in the accompanying drawings does not necessarily need a particular execution order to achieve the desired results. In some implementations, multi-tasking and concurrent processing is feasible or can be advantageous.

It should be understood that, for a person of ordinary skill in the art, various modifications to the implementations in the present specification will be obvious, and the general principles defined in the present specification can be applied to other variations without departing from the protection scope of the claims.

What is claimed is:

1. A computer-implemented method, comprising:
communicating, by a second RDMA network interface controller of a second host with a first RDMA network interface controller of a first host, to receive m data packets from the first RDMA network interface controller, wherein the m data packets have been backed up by the first RDMA network interface controller to a first network interface controller memory integrated into the first RDMA network interface controller, m being a positive integer; and
in response to determining that n data packets of the m data packets have not been received, n being a positive integer:
storing, by the second RDMA network interface controller, received data packets of the m data packets into a second network interface controller memory integrated into the second RDMA network interface controller;

waiting, by the second RDMA network interface controller, to receive the n data packets having been retransmitted by the first RDMA network interface controller, wherein the retransmitted n data packets are obtained by the first RDMA network interface controller from the first network interface controller memory; and after the retransmitted n data packets have been received by the second RDMA network interface controller, transmitting the received data packets together with the retransmitted n data packets to a host memory of the second host.

2. The computer-implemented method of claim 1, wherein the first network interface controller memory integrated into the first RDMA network interface controller is a dynamic random access memory.

3. The computer-implemented method of claim 1, wherein the second network interface controller memory integrated into the second RDMA network interface controller is a dynamic random access memory.

4. The computer-implemented method of claim 1, wherein after determining that n data packets of them data packets have not been received, the method further comprises:

sending, by the second RDMA network interface controller, negative acknowledgement (NACK) responses for the n data packets to the first RDMA network interface controller.

5. The computer-implemented method of claim 1, wherein after determining that n data packets of the m data packets have not been received, the method further comprises:

not sending acknowledgement (ACK) responses for the n data packets to the first RDMA network interface controller.

6. The computer-implemented method of claim 1, wherein the first RDMA network interface controller is configured to delete the m data packets from the first network interface controller memory in response to determining that the second RDMA network interface controller has received the m data packets, including the n data packets that have been retransmitted by the first RDMA network interface controller.

7. A non-transitory, computer-readable medium storing one or more instructions executable by a computer system to perform operations comprising:

communicating, by a second RDMA network interface controller of a second host with a first RDMA network interface controller of a first host, to receive m data packets from the first RDMA network interface controller, wherein the m data packets have been backed up by the first RDMA network interface controller to a first network interface controller memory integrated into the first RDMA network interface controller, m being a positive integer; and in response to determining that n data packets of the m data packets have not been received, n being a positive integer:

storing, by the second RDMA network interface controller, received data packets of the m data packets into a second network interface controller memory integrated into the second RDMA network interface controller;

waiting, by the second RDMA network interface controller, to receive the n data packets having been retransmitted by the first RDMA network interface controller, wherein the retransmitted n data packets are obtained by the first RDMA network interface controller from the first network interface controller memory; and after the retransmitted n data packets have been received by the second RDMA network interface controller, transmitting the received data packets together with the retransmitted n data packets to a host memory of the second host.

8. The computer-readable medium of claim 7, wherein the first network interface controller memory integrated into the first RDMA network interface controller is a dynamic random access memory.

9. The computer-readable medium of claim 7, wherein the second network interface controller memory integrated into the second RDMA network interface controller is a dynamic random access memory.

10. The computer-readable medium of claim 7, wherein after determining that n data packets of them data packets have not been received, the operations further comprise:

sending, by the second RDMA network interface controller, negative acknowledgement (NACK) responses for the n data packets to the first RDMA network interface controller.

11. The computer-readable medium of claim 7, wherein after determining that n data packets of the m data packets have not been received, the operations further comprise:

not sending acknowledgement (ACK) responses for the n data packets to the first RDMA network interface controller.

12. The computer-readable medium of claim 7, wherein the first RDMA network interface controller is configured to delete the m data packets from the first network interface controller memory in response to determining that the second RDMA network interface controller has received the m data packets, including the n data packets that have been retransmitted by the first RDMA network interface controller.

13. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

communicating, by a second RDMA network interface controller of a second host with a first RDMA network interface controller of a first host, to receive m data packets from the first RDMA network interface controller, wherein the m data packets have been backed up by the first RDMA network interface controller to a first network interface controller memory integrated into the first RDMA network interface controller, m being a positive integer; and in response to determining that n data packets of the m data packets have not been received, n being a positive integer:

storing, by the second RDMA network interface controller, received data packets of the m data packets into a second network interface controller memory integrated into the second RDMA network interface controller;

waiting, by the second RDMA network interface controller, to receive the n data packets having been retransmitted by the first RDMA network interface controller, wherein the retransmitted n data packets are obtained by the first RDMA network interface controller from the first network interface controller memory; and after the retransmitted n data packets have been received by the second RDMA network interface controller, transmitting the received data packets together with the retransmitted n data packets to a host memory of the second host.

14. The computer-implemented system of claim 13, wherein the first network interface controller memory integrated into the first RDMA network interface controller is a dynamic random access memory.

15. The computer-implemented system of claim 13, wherein the second network interface controller memory integrated into the second RDMA network interface controller is a dynamic random access memory.

16. The computer-implemented system of claim 13, wherein after determining that n data packets of the m data packets have not been received, the operations further comprise:

sending, by the second RDMA network interface controller, negative acknowledgement (NACK) responses for the n data packets to the first RDMA network interface controller.

17. The computer-implemented system of claim 13, wherein after determining that n data packets of the m data packets have not been received, the operations further comprise:

not sending acknowledgement (ACK) responses for the n data packets to the first RDMA network interface controller.

18. The computer-implemented system of claim 13, wherein the first RDMA network interface controller is configured to delete the m data packets from the first network interface controller memory in response to determining that the second RDMA network interface controller has received the m data packets, including the n data packets that have been retransmitted by the first RDMA network interface controller.

* * * * *

UNITED STATES PATENT AND TRADEMARK OFFICE
CERTIFICATE OF CORRECTION

PATENT NO. : 10,911,541 B1
APPLICATION NO. : 16/945621
DATED : February 2, 2021
INVENTOR(S) : Changqing Li et al.

It is certified that error appears in the above-identified patent and that said Letters Patent is hereby corrected as shown below:

In the Specification

Column 1 / Line 8, Delete "with" and insert -- which --, therefor.

In the Claims

Column 15 / Line 22, Claim 4, delete "them" and insert -- the m --, therefor.

Column 16 / Line 19, Claim 4, delete "them" and insert -- the m --, therefor.

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*